(12) United States Patent
Bolander et al.

(10) Patent No.: US 7,667,603 B2
(45) Date of Patent: Feb. 23, 2010

(54) EMBEDDING ITEMS WITH RFID TAGS FOR TRACKING AND CALIBRATION

(75) Inventors: Jarie G. Bolander, San Francisco, CA (US); Paul A. Lovoi, Saratoga, CA (US); Teri E. Judelson, Saratoga, CA (US); Geoff A. Zawolkow, San Carlos, CA (US)

(73) Assignee: Tagent Corporation, Sunnyvale, CA (US)

( * ) Notice: Subject to any disclaimer, the term of this patent is extended or adjusted under 35 U.S.C. 154(b) by 283 days.

(21) Appl. No.: 11/404,567

(22) Filed: Apr. 13, 2006

(65) Prior Publication Data

US 2010/0023429 A1  Jan. 28, 2010

(51) Int. Cl.
*G08B 13/14* (2006.01)
(52) U.S. Cl. ............. 340/572.4; 340/572.1; 340/539.13
(58) Field of Classification Search .............. 340/572.1, 340/572.4, 573.1, 568.1, 500, 505, 10.1, 340/10.3, 10.4, 10.41, 10.51, 825.65; 705/39; 235/380, 385
See application file for complete search history.

(56) References Cited

U.S. PATENT DOCUMENTS

| | | | |
|---|---|---|---|
| 6,340,588 B1* | 1/2002 | Nova et al. ..................... 506/16 |
| 6,480,699 B1 | 11/2002 | Lovoi | |
| 6,534,711 B1* | 3/2003 | Pollack ........................ 174/529 |
| 6,883,710 B2* | 4/2005 | Chung ......................... 235/385 |
| 7,015,826 B1* | 3/2006 | Chan et al. ............. 340/870.17 |
| 2005/0171898 A1* | 8/2005 | Bishop et al. ................. 705/39 |
| 2006/0226985 A1* | 10/2006 | Goodnow et al. ......... 340/572.1 |
| 2006/0237528 A1* | 10/2006 | Bishop et al. ............... 235/380 |
| 2007/0052517 A1* | 3/2007 | Bishop et al. ................ 340/5.2 |
| 2007/0176751 A1* | 8/2007 | Cesar et al. ............. 340/10.32 |
| 2007/0231209 A1* | 10/2007 | Cosentino et al. .......... 422/68.1 |
| 2007/0231846 A1* | 10/2007 | Cosentino et al. ............. 435/14 |

* cited by examiner

*Primary Examiner*—Van T. Trieu
(74) *Attorney, Agent, or Firm*—Thomas M. Freiburger

(57) ABSTRACT

RFID tags of very small size are embedded in products or composed of products in a manufacturing process. The system employs different read and write modes to enable auto-tracking of material, some assembly, assembly and component items through various stages of the manufacturing process. As each item passes special predetermined points in the manufacturing process, the embedded tag is activated and placed in track mode. The tag transmits its ID and a track count representing the number of stations passed. The tag's track count is incremented and the updated track count is stored in non-volatile memory in the tag. The tags can be programmed so that once the count exceeds a predetermined count, a status bit is set in the tag's memory indicating that the item has been completely through the manufacturing process. Thus, the system can determine whether an item or product has been completed. After manufacture the same RFID tag can be used for tracking, inventory and item authentication.

13 Claims, 2 Drawing Sheets

EMBEDDING ITEMS WITH RFID TAGS FOR TRACKING AND CALIBRATION

BACKGROUND OF THE INVENTION

This invention concerns the use of RFID tags. Specifically the invention applies or embeds miniature RFID tags to or into components or products in a manufacturing process, to track the progress of manufacturing, to assure that all operations have been performed on each item and also to provide useful data to the end user of the item.

Traditionally, tracking of items during manufacture typically has been done manually using paper travelers in combination with line-of-sight bar codes. This is inefficient, and bar codes usually have insufficient data and coding capability to identify every part uniquely, and also cannot be written to, in order to determine where the item has been. Often a bar code has only been applied to a bin containing a number of similar components. The bin can become mixed, causing misprocessing, and individual reading and tracking of each item is not possible.

A miniaturized RFID tag is disclosed in U.S. Pat. No. 6,480,699, and the use of such a small stand-alone tag device which includes an onboard antenna is envisioned for the present invention described below.

SUMMARY OF THE INVENTION

RFID tags of very small size are embedded in products or components of products in a manufacturing process. The system employs different read and write modes to enable auto-tracking of material, subassembly, assembly and component items through various stages of the manufacturing process. As each item passes special predetermined points in the manufacturing process, the embedded tag is activated and placed in track mode. The tag transmits its ID and a track count representing the number of stations passed. The tag's track count is incremented and the updated track count is stored in non-volatile memory in the tag. The tags can be programmed so that once the count exceeds a predetermined count, a status bit is set in the tag's memory indicating that the item to which the tag is attached has been completely through the manufacturing process. Thus, the system can determine whether an item or product has been completed.

In a preferred embodiment the track mode is enabled by having the item in close proximity to a power supply node so that the power is transferred very rapidly to the tag as compared to a normal interrogation/read cycle. For example, power might be transferred to the power supply of the tag in about 1/10 the time of a normal read cycle. The embedded RFID tag senses this rapid power ramp, determines this is track mode and then immediately transmits its data payload which includes its unique ID, specific characteristics of the item (like date of assembly, calibration for the item and expiration date) and track count using a different preamble and post-amble than used in a normal read.

In a preferred embodiment, to complete a track mode operation, a second high power pulse is sent to charge the tag over a very short period (e.g. 1/10 the normal time), maintains a constant power for a sufficient time as to enable the tag to sense it should increment its count, causes the tag to increment its track count (i.e. the track count will be higher by one), and stores the updated track count in a non-volatile memory. Note that the incrementing of the count could be done as part of the routine of a single rapid power-up, that is, there would be enough power for this. However, it is preferably in two separate power-up steps because it might be desired to do the count increment at a later point in the process. For example, the ID read and data transmission could occur at the beginning of a manufacturing step, but the count increment only after the step has been completed. This give more information: that the part arrived at the beginning of the step; and that the step was completed.

In a preferred form of the invention, once the track count exceeds a predetermined count, which is programmed when the ID is programmed into the tag, the fast read mode will not output any ID or track count. At that point, a status bit preferably is set in the normal read mode ID space saying that the item has been completely through the manufacturing process. This allows the system to determine whether an item has been completed or not.

The track count can be used to associate the item being tracked with its position within the manufacturing process. Since the location of the power sources and readers is known by the system of the manufacturer, as well as the manufacturing sequence, the system can determine the following item status:

1. How many manufacturing points has the item been through?
2. Does the track count match the track count at the point in the process where the item is?
3. Has the item been fully processed?

The system also enables determination of live constraints in the manufacturing process, how much inventory is in a particular line at any time, and accurate prediction of number of products that will be completed within a certain time.

The system of the invention thus enables automatic tracking of an item embedded within an RFID tag throughout a manufacturing process. The system solves the problem of ensuring that an item or component has been through the proper steps in the manufacturing process, before it is released to a customer.

According to the invention the RFID tag that is fixed to components or products for keeping track of the manufacturing process has post-manufacturing functions as well. Following manufacturing the tag is used for inventory and in use by a customer, for keeping track of products sold, and to whom, and for keeping track of inventory, theft control and other functions at the customer's facility. The post-manufacturing use of the tag can also relate to specific information carried by the tag, such as lot number, expiration date, and calibration.

Calibration is important for a number of products that inevitably vary somewhat during manufacturing, and thus need a calibration number for proper use by the customer. One example is electronic components; another is dry reagent testing strips (such as glucose test strips), which have variation and need to carry a calibration indication. The calibration number or code (which can be attached to the tag ID) enables a reader to determine the specific characteristics of the test strip, as well as where the strip came from, the expiration date of the strip, whether this is the correct strip for the test to be conducted, etc. This is important for accuracy and automatic calibration in post-manufacturing use. The objective is that the dry reagent test strip carry all critical information directly on the strip, to enable to automatic calibration, tracking, checking and tracing of these strips, thus eliminating human error. The same tag, pursuant to the invention, can be used for tracking during the manufacturing process, to be sure that each test strip has all operations performed and has had its calibration encoded on the tag.

It is thus among the objects of the invention to provide and establish an automated tracking system for manufacturing processes, wherein RFID tags are embedded in or carried on products or components, and the tags have read and write count capability, carrying data in each tag as to progress in the manufacturing procedure, which data can be downloaded by the system to determine status. These and other objects, advantages and features of the invention will be apparent from the following description of preferred embodiments, considered along with the accompanying drawings.

DESCRIPTION OF PREFERRED EMBODIMENTS

Figure 1:
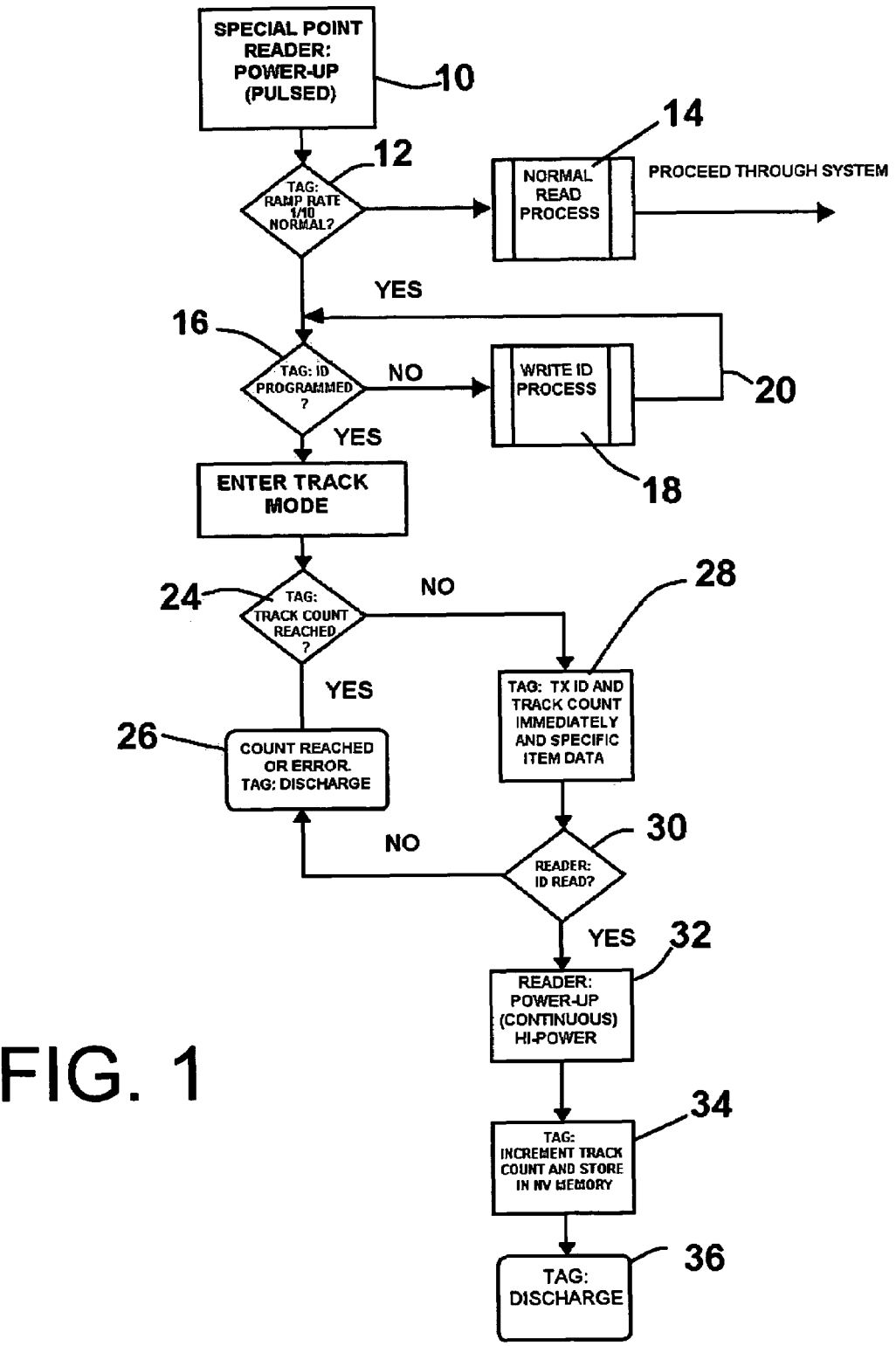
FIG. 1 is a simplified flow chart illustrating a system of the invention for auto-tracking of items in a manufacturing process, and showing a routine of a tag.
Figure 2:
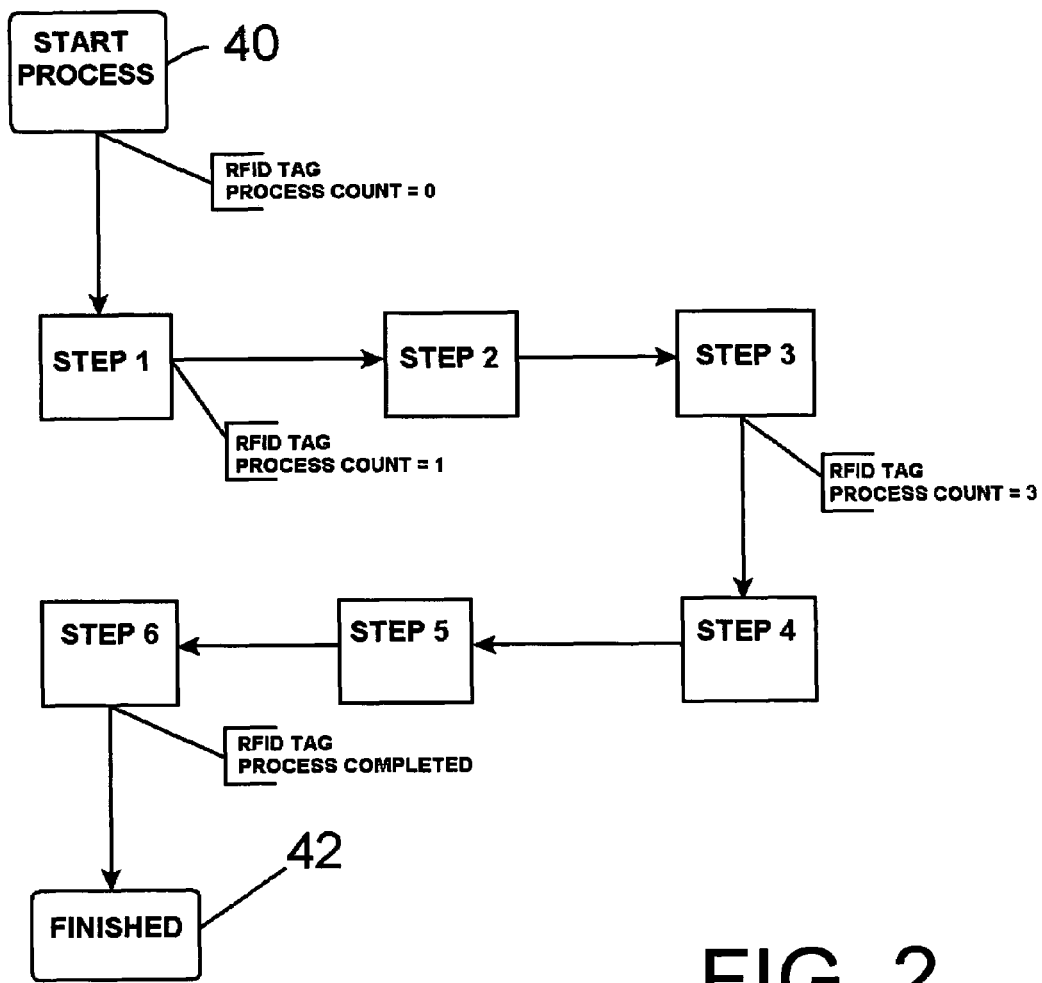
FIG. 2 is a simplified flow chart schematically showing a manufacturing process for a product carrying a tag through the process.

In the drawings, FIG. 1 shows in simplified form a routine that is carried out by the system of the invention, in the manufacturing or assembly process, to ensure that all parts or components are subjected to all required steps. FIG. 2 shows a very simple example of the manufacturing process with multiple steps, as components proceed through these steps with an RFID tag attached to or embedded in each component. In the block 10 in FIG. 1 a special point reader is indicated, situated at a particular step in the manufacturing process. The reader 10 is at high power, such as to power up the tag on the item or component of manufacture at a very rapid ramp rate, such as about $1/10$ of the normal time for powering up. This is to signify that the tag is not to proceed through a normal read process but is to proceed in track mode. The decision block 12 queries whether the ramp rate was the prescribed rapid rate, and if not, the tag would go into a normal read process, without track mode, for the usual purposes in other situations of inventory control, theft control, item authentication, etc. This is indicated at 14, but if the reader at the block 10 is a special point reader, functioning correctly, the normal read process 14 will not occur.

The next decision block 16 checks to see whether the RFID tag has had its ID programmed, to be sure the tag is not defective in this way. If not, the tag goes through the corrective process of having the ID written to the tag, as indicated in the block 18, then the loop 20 returns back to the decision block 16 as indicated. Each reader 10 in the system can write an ID or other necessary data to a tag.

After it is confirmed that the tag contains its ID, the tag enters track mode as indicated in the block 22. Next, the decision block 24 inquires whether a pre-programmed maximum track count for this process has been reached. If so, nothing further is done with this tag and the tag is allowed to discharge, as at 26. The component or product to which the tag is attached is then directed to the correct location, such as an area for completed items.

Assuming the track count has not been reached, the routine proceeds to the RFID tag's transmitting its ID, specific item data and track count immediately, as indicated in the block 28 in FIG. 1. The specific item data can include calibration data for an item such as an electronic component or a glucose test strip, for example. This step confirms the data is on the tag, and can confirm accuracy of values of the data, by communication with the earlier manufacturing step where the item was tested and its calibration was written to the tag. Note that the ID on the tag could carry the calibration data in it. The reader looks to see that it was able to read an ID from the tag, as noted in the decision block 30, and if not, an error has occurred and again nothing further is done and the tag is allowed to discharge, at 26. At this point an error message will be generated to alert the process operator that a read error has occurred.

If the reader is able to read the ID on the tag at the block 30, then the routine proceeds to a second powering-up of the tag, again at high power, for a fast ramp rate, $1/10$ normal time in this example, as shown in the block 32. This power-up can be at continuous power, as distinct from the first power-up, to confirm that a count increment should take place. Otherwise, an accidental rapid power-up (due to shorter range) could increment the count by mistake. As explained above, this second rapid power up, although not actually needed for providing sufficient power to the tag, gives a confirming signal to the tag that it should proceed further in the track mode operation, causing the tag to increment its track count and store that track count in non-volatile memory, shown in the block 34.

The tag on the item now carries its track count indicating that a particular operation at the particular special point has been made. The item then proceeds to the next operation or to an area for completed items, and the tag soon discharges as indicated at 36. Note that if all manufacturing operations have been completed, the system may include a further special reading step wherein the tag is subjected to rapid ramp rate power-up, essentially the first few steps of FIG. 1. Each item which has been completed in manufacture can then pass by this last special point, which will confirm that all steps have been completed, by going through the iteration shown in FIG. 1 up through the decision block 24. The routine will end at this point, assuming a "yes" answer to the tag's query at the block 24, because the tag will discharge without transmitting its track count, so the reader and system will determine that the item has been completed. The completed item can then be directed to an area for finished items. Note that the full track count status could be determined otherwise. The system could cause the tag to transmit its full track count (block 28) in this special reading step, or, without such a special reading step, the system at the point the track count (block 28) is transmitted as N-1 will know that a subsequent incrementing of the track count (block 34) will in fact produce the full track count, and the system can determine completion at that point.

As noted above, FIG. 2 shows schematically a simple outline of a manufacturing process with six steps to be performed on an item or component or part. The process starts at 40, and each item going through the process has an RFID tag, as indicated.

The item goes through step 1 and its RFID tag increases its track count to 1. The same thing occurs at steps 2, 3, 4, 5 and 6. At step 6 as indicated in FIG. 2 the process has been completed, and the RFID tag, when powered up, can determine this by querying itself. It can also be queried by any subsequent reader with the rapid power ramp-up, and all items proceeding off the assembly line could be queried in this way in succession, to flag any item going through the system that has not had all operations performed. The status of the item as finished is indicated in the block 42.

As described above, the RFID tags according to the invention have important use in monitoring and auditing manufacture, through the track count procedure described, and also in post-manufactured use. Calibration data, as well as accompanying expiration date, origin of manufacture, type of component, etc., are automatically used by equipment downstream. If the calibrated item is a reagent test strip, a machine performing a test will automatically read the tag and determine the calibration data and other important data as noted above, then adjust the test parameters to allow for the item's specific calibration. In addition, the RFID tag can be used in the more conventional ways for inventory control, tracking of the post-manufactured items and theft prevention, for example.

The above described preferred embodiments are intended to illustrate the principles of the invention, but not to limit its scope. Other embodiments and variations to this preferred embodiment will be apparent to those skilled in the art and may be made without departing from the spirit and scope of the invention.

We claim:

1. A method for tracking progress of products or components of products as to operations performed in a manufacturing process, comprising:
    attaching an RFID tag to each of a plurality of the products or components, the RFID tag being of the passive type without onboard battery and which derives power to operate from an interrogating RF signal from a reader,
    at each of a plurality of stations in the manufacturing process, sending an interrogating RF signal to a product or component bearing an RFID tag,
    the interrogating RF signal at a particular station containing a triggering signal that, when the RF signal powers up the tag, causes the tag to respond with the tag's unique ID and with a track count representing a number of stations which the tag has passed through up to that point prior to the particular station,
    and the RFID tag incrementing its track count to reflect presence at the particular station, and storing the incremented track count in a non-volatile memory before the tag discharges.

2. The method of claim 1, wherein the incrementing of the track count is triggered by the receipt of a second discrete triggering powering-up signal by the RFID tag.

3. The method of claim 1, wherein the triggering signal comprises the interrogating RF signal being of much higher power than used in reading of the RFID tag for other, or normal, purposes such as inventory track, item calibration or item authentication.

4. The method of claim 1, wherein the RFID tag on a product or component carries a calibration for the particular product or component, in a case where calibration will vary from component to component, and wherein the triggering signal causes the tag to respond with the component's calibration as well as with the tag's unique ID and a track count.

5. The method of claim 4, wherein the products or components are glucose test strips, and wherein the calibration data relate to the calibration of the glucose test strip for the measurement of blood sugar.

6. The method of claim 4, wherein the calibration carried by the tag is used to represent the performance of an integrated circuit.

7. The method of claim 4, wherein the products or components are glucose test strips or dry reagent test strips, wherein the calibration data relate to the calibration of the glucose test strip for the measurement of blood sugar, and further including, following the manufacturing process, using the calibration data later at a post-manufacturing facility, by reading the calibration data and applying the data for calibration of a blood sugar test on a living individual.

8. The method of claim 4, further including use of the calibration of the product or component in a post-manufacturing procedure wherein the product is used with its calibration known, in order to produce an accurate result for the product or component.

9. The method of claim 1, further including, prior to completion of the manufacturing process, leaving the RFID tag attached to the product or component and using the RFID tag in a normal read mode for purposes of inventory control, tracking or authentication of the products or components.

10. The method of claim 1, further including use of the RFID tag on the product or component following the manufacturing process, for inventory, theft control, authentication or product tracking purposes.

11. The article of claim 1, wherein the tag further carries data identifying a calibration for the article.

12. An article of manufacture with an RFID tag attached, and the RFID tag being of the passive type without onboard battery and which derives power to operate from an interrogating RF signal from a reader, and the RFID tag carrying data including a readable unique ID code for the tag and a track count contained in non-volatile memory, the track count being capable of incrementing upon receipt by the tag of a signal from a reader, whereby the track count can verify that the article has been through a plurality of stations having such readers.

13. The article of claim 12, wherein the article is in an uncompleted manufactured state, whereby the tag's track count can verify the article has been through a desired number of operations.

* * * * *